(12) United States Patent
Xin et al.

(10) Patent No.: US 11,340,342 B2
(45) Date of Patent: May 24, 2022

(54) AUTOMOTIVE RADAR USING 3D PRINTED LUNEBURG LENS (71) Applicant: ARIZONA BOARD OF REGENTS ON BEHALF OF THE UNIVERSITY OF ARIZONA, Tucson, AZ (US)

(72) Inventors: Hao Xin, Tucson, AZ (US); Min Liang, Tucson, AZ (US); Siyang Cao, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 519 days.

(21) Appl. No.: 16/325,111

(22) PCT Filed: Aug. 15, 2017

(86) PCT No.: PCT/US2017/046998
§ 371 (c)(1),
(2) Date: Feb. 12, 2019

(87) PCT Pub. No.: WO2018/035148
PCT Pub. Date: Feb. 22, 2018

(65) Prior Publication Data
US 2021/0278518 A1 Sep. 9, 2021

Related U.S. Application Data (60) Provisional application No. 62/375,349, filed on Aug. 15, 2016.

(51) Int. Cl.
*G01S 13/42* (2006.01)
*G01S 13/931* (2020.01)
(Continued)

(52) U.S. Cl.
CPC .......... *G01S 13/426* (2013.01); *G01S 13/931* (2013.01); *G05D 1/0257* (2013.01); *B33Y 80/00* (2014.12)

(58) Field of Classification Search
CPC .. B60W 2420/52; B60W 30/14; B60W 40/02; G01S 13/42; G01S 13/426;
(Continued)

(56) References Cited

U.S. PATENT DOCUMENTS 5,047,776 A 9/1991 Baller
5,657,021 A 8/1997 Ehsani-Nategh et al.
(Continued)

FOREIGN PATENT DOCUMENTS

| JP | 2005-534231 A | 11/2005 |
| JP | 2008-128807 A | 6/2008 |
| JP | 2009-250626 A | 10/2009 |
| JP | 2012-037306 A | 2/2012 |
| WO | 2015/197223 A1 | 12/2015 |

OTHER PUBLICATIONS

Liang et al. "A 3-D Luneburg Lens Antenna Fabricated by Polymer Jetting Rapid Prototyping" IEEE Transactions on Antennas and Propagation. Apr. 2014, 62(4).
(Continued)

*Primary Examiner* — Timothy A Brainard
(74) *Attorney, Agent, or Firm* — Mintz Levin Cohn Ferris Glovsky and Popeo, P.C.; Frank L. Gerratana (57) ABSTRACT

A high performance, low-cost automotive radar is designed by mounting receivers around a 3D printed Luneburg lens. With this configuration, the antenna radiation pattern is maintained for all angles, (which means no beam deformation). Further, the present radar is capable of performing detection at all azimuth and elevation angles with high angle resolution and broadband operation. The radar adaptively adjusts its spatial sensing pattern, sweeping frequency band, pulse repetition frequency and coherent processing interval
(Continued)

according to the environment. This is accomplished by initially performing a rough scan, which updates sensing results via a narrow bandwidth waveform and wide beam scanning. When interested objects are identified, a high-resolution detailed scan is performed in a specific region of interest. In this way, a much more effective detection can be obtained. Moreover, a method of mitigating interference of the 3D printed Luneburg lens based radar and a method of improving the angle resolution using a lens based MIMO approach is disclosed.

20 Claims, 10 Drawing Sheets

(51) Int. Cl.
*G05D 1/02* (2020.01)
*B33Y 80/00* (2015.01)

(58) Field of Classification Search
CPC ....... G01S 13/931; G01S 7/03; G05D 1/0257; H01Q 1/3233; H01Q 15/08; H01Q 21/29; H01Q 25/008
See application file for complete search history.

(56) References Cited

U.S. PATENT DOCUMENTS

| | | | |
|---|---|---|---|
| 6,717,544 | B2 | 4/2004 | Nagasaku et al. |
| 6,754,368 | B1 | 6/2004 | Cohen |
| 7,667,665 | B1 | 2/2010 | Colburn et al. |
| 8,098,187 | B1 | 1/2012 | Lynch et al. |
| 2006/0145919 | A1* | 7/2006 | Pleva ............... H01Q 25/00 342/368 |
| 2009/0121918 | A1 | 5/2009 | Shirai et al. |
| 2012/0202538 | A1 | 8/2012 | Uusitalo et al. |
| 2014/0139370 | A1* | 5/2014 | Hamner ............ H01Q 21/0031 342/175 |
| 2016/0061935 | A1 | 3/2016 | McCloskey et al. |

OTHER PUBLICATIONS

International Search Report Issued for PCT Application No. PCT/US2017/046998 dated Oct. 31, 2017.

Y. Chen et al., "Distributed Spectrum Sensing and Access in Cognitive Radio Networks With Energy Constraint," IEEE Transactions on Signal Processing, vol. 57, No. 2, Feb. 2009, pp. 783-797.

* cited by examiner

FIG. 1

Providing the Luneburg based millimeter wave automotive radar
201

Generating a plurality of wide beam patterns and transmitting said beams to the environment via one or more transceivers
202

Focusing a first set of signals via the 3D printed Luneburg lens
203

Receiving the first set of signals via a plurality of feeding elements
204

Processing the first set of signals via a plurality of processing elements and determining regions of interest
205

Generating a narrow beam and transmitting said beam to each region of interest via the one or more transceivers
206

Focusing a second set of signals via the 3D printed Luneburg lens
207

Receiving the second set of signals via the plurality of feeding elements
208

Processing the second set of signals, via the processing elements to determine information about each region of interest
209

Sequential sensing
(100% sensing data)
SNR = 15dB

Transform sensing w/de-noising
(47% sensing data)
SNR = 15dB

AUTOMOTIVE RADAR USING 3D PRINTED LUNEBURG LENS

CROSS-REFERENCES TO RELATED APPLICATIONS

This application is a 371 and claims benefit of PCT/US2017/046998 filed Aug. 15, 2017, which claims benefit of U.S. Provisional Application No. 62/375,349 filed Aug. 15, 2016, the specification(s) of which is/are incorporated herein in their entirety by reference.

FIELD OF THE INVENTION

The present invention relates to a method of adaptively sensing the surrounding environment of an autonomous automobile using a 3D printed Luneburg lens based millimeter wave radar and a method of mitigating interference of said radar.

BACKGROUND OF THE INVENTION

Until recently, autonomous transportation has only existed in science fiction. With a number of exciting experiments demonstrated, it is clear that self-driving automobiles are getting closer to reality. Considering over 250 million automobiles in the United States and 1.2 billion automobiles in the world, autonomous transportation represents a huge emerging market with stakeholders including governments, private industry, and individual consumers. For autonomous transportation to become reality as desired, sensor systems with high performance, high reliability and affordability are necessary. Currently, a number of technologies have been utilized for automotive sensing applications, including radar, Lidar, ultrasound, and camera based sensors. However, none of the existing systems are adequate for autonomous driving in complicated scenarios due to lack of resolution, sensitivity, all-weather capability and affordability.

The present invention proposes to investigate and develop a novel millimeter wave (30-300 GHz) radar (76-81 GHz) with high angular resolution (<2°), long detection range (>200 m), and full coverage surrounding an automobile that may present a critical sensor solution satisfying the challenging requirements of autonomous driving. The proposed radar combines innovative hardware (3-dimensional ("3D") printing enabled Luneburg lens) and advanced sensing (adaptive radar techniques) with interference avoidance and fast processing capabilities. It will have adequate sensitivity and resolutions (angular, range, and Doppler/speed) to locate and recognize all moving and stationary targets surrounding an automobile within 10 milliseconds, while maintaining a compact size and affordable cost.

Compared to ultrasonic sensors, millimeter wave radar has the advantages of smaller size, lighter weight, higher resolution, and longer range. Compared to Lidar and camera based sensors, it has much better performance in penetrating rain, snow, fog, smoke, and dust, leading to higher reliability that is critical for autonomous driving. Although Lidar provides the highest resolution among all existing sensors and is used in most of the current autonomous automobile prototypes, its high cost and adverse response to inclement weather are major drawbacks.

A 3D Luneburg lens with gradient index has advantages of high gain, broadband functionality, and capability of forming multiple beams simultaneously, which are highly desirable for many wireless sensing and communication applications. However, the conventional manufacturing methods to fabricate Luneburg lens are time consuming, expensive or can be only used to build 2D lenses. As a result, the upper frequency limit for commercially available 3D Luneburg lens is only 10 GHz, not suitable for millimeter-wave radar. The present invention utilizes a 3D printed Luneburg lens operating in the millimeter wave range. An exemplary fabrication technique of such a lens is disclosed in "A 3D Luneburg Lens Antenna Fabricated by Polymer Jetting Raped Prototyping," Xin, et. al. Compared to conventional manufacturing techniques, Xin's 3D printing approach is much more convenient, fast, inexpensive and capable of implementing Luneburg lenses in the millimeter-wave range.

By mounting feeding elements (e.g., antennas) on the 3D printed Luneburg lens surface, high performance beam steering can be performed as the feeding elements are mounted to a non-planar surface. Compared to the conventional planar phased array radars used today, the proposed Luneburg lens based radar has a significantly improved gain and sharper beams, leading to a much better SNR (>factor of 2), angular resolution (>factor of 2), and detection range with the same number of feeding elements. Moreover, because of the spherical symmetry of the Luneburg lens, the proposed radar can cover all azimuth and elevation angles with the same performance operation of the conventional planar phased array radar, thus eliminating the need for separating far, mid, and near range hardware. Furthermore, the special focusing property of Luneburg lens enables greatly reduced computational cost in angle estimation compared to conventional planar array radars. Consequently, the processing time can be greatly reduced with this novel Luneburg lens based configuration, especially for wide fields of view coverage with high angular resolution. With the characteristic wide bandwidth and natural beam forming of the Luneburg lens array, the Luneburg lens based radar of the present invention can adaptively adjust its spatial sensing pattern, sweeping frequency band, pulse repetition frequency, and coherent processing interval according to the environment.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In brief, it is an objective of the present invention to provide a more efficient radar sensing system. An embodiment of the present invention features an adaptive sensing method for scanning an environment, comprising a plurality of specific regions, surrounding an autonomous automobile. In some embodiments, the method comprises providing a millimeter wave automotive radar. In other embodiments, the millimeter wave automotive radar comprises: one or more millimeter wave transceivers, a 3D printed Luneburg lens having an upper frequency limit in a millimeter wave range, a plurality of antenna feed elements operatively coupled to the one or more millimeter wave transceivers, and one or more processing elements operatively coupled to the plurality of antenna feed elements. In an embodiment, the plurality of antenna feed elements is mounted to a surface of the 3D printed Luneburg lens and are each positioned in a determined direction. In another embodiment, each processing element processes a given signal originating from a specific region, of the plurality of specific regions.

In further embodiments, a rough scan of the environment is performed via the millimeter wave automotive radar. In preferred embodiments, the rough scan comprises the steps of:

(i) generating one or more wide beam patterns, via the plurality of processing elements, that are transmitted to the environment by the one or more millimeter wave transceivers;

(ii) receiving a first set of signals, resulting from interactions between the one or more wide beam patterns and the environment, via the one or more millimeter wave transceivers, where the first set of signals are focused by the 3D printed Luneburg lens prior to their reception by the plurality of antenna feed elements; and (iii) processing the first set of signals via the plurality of processing elements, where, if a signal strength of a signal exceeds a first predetermined threshold, then the specific region of the processing element is considered a region of interest.

In additional embodiments, a detailed scan is then performed comprising the steps of:

(i) generating a narrow scanning beam, via the plurality of processing elements, that is transmitted to each region of interest via the one or more millimeter wave transceivers;

(ii) receiving a second set of signals, via the plurality of millimeter wave transceivers, resulting from interactions between the narrow beam and each region of interest, where the 3D printed Luneburg lens focuses the second set of signals prior to their reception by the plurality of antenna feed elements; and (iii) processing the second set of signals, via the plurality of processing elements, to determine information about each region of interest.

Use of the 3D printed Luneburg lens for digitally focusing the first and second set of signals before processing results in an improvement in signal to noise ratio, angular resolution, detection range, and faster processing compared to conventional planar phased arrays. Further, performing the rough scan and, subsequently, the detailed scan adaptively adjusts a spatial sensing pattern, a sweeping frequency band, a pulse repetition frequency, and a coherent processing interval according to the environment.

In some embodiments, the method further comprises determining channels of the millimeter wave spectrum that are available, for a period of time, to estimate the opportunity spectrum access ("OSA"). In other embodiments, Partially Observable Markov Decision Process ("POMDP") is used to estimate the OSA. The frequency band of the millimeter wave spectrum is divided into multiple channels, and the POMDP is used to describe the availability of the channels. According to past observations of interference, the POMDP predicts the existence of interference in a given channel in the near future. Available channels are considered those having low probability of interference.

Systems and methods for improving the angular resolution (i.e., spatial resolution) of radars for use in autonomous automobiles have been the subject of various patents. However, these systems and methods consistently require a significant increase in the complexity of the design of the radar, which increases the cost and signal processing burden. For example, US20070296640 details a multi-beam antenna utilizing a spherical, shared dielectric lens for use in long and short range automotive radar detection. Waveguide feeds, coupled to the surface of the lens at predetermined positions, propagate electromagnetic waves at a selected frequency. The dielectric lenses and waveguide feeds cause a significant increase in the size and complexity of the system size and thus require expensive manufacturing costs. Further, the large size of the waveguide feeds prohibits the achievement of high angular resolution.

Additionally, US20060158369 describes a millimeter wave automotive radar for use in autonomous driving. The radar consists of an antenna plate, on which a transmitting antenna and two receiving antennas are arranged, and a processor that detects the azimuth angle of a target with respect to a reference direction. The need for an improved angular coverage is addressed here as well, but at a cost of increased complexity of the design (requires a motor to operate the rotating antenna plate).

Thus, technical problem of improving the scanning resolution of radars, for use in autonomous automobiles, at little to no cost persists. The Luneburg lens based millimeter wave automotive radar of the present invention provides a technical solution as the high gain, broadband functionality, and the simultaneous multiple beam forming capability of the Luneburg lens, having an upper frequency limit in a millimeter wave range, provides a significantly improved gain and sharper beams, leading to an improved angular resolution (>factor of 2). This improvement is acquired without increasing the complexity of the design as the same number of feeding elements are required. Moreover, the present invention also features a multiple input multiple output ("MIMO") technique that further improves the angular resolution of the present millimeter wave automotive radar without requiring an increase in the number of transceivers.

Further, the proposed adaptive sensing method, executed via the present millimeter wave automotive radar, has demonstrated an improved scanning efficiency (which directly relates to the scanning speed) of between 2-10 times (depending on the complexity of the environment) compared to conventional radars.

BRIEF DESCRIPTION OF THE DRAWINGS

The features and advantages of the present invention will become apparent from a consideration of the following detailed description presented in connection with the accompanying drawings in which.

DETAILED DESCRIPTION OF THE INVENTION

Referring now to FIGS. 1-12C, the present invention features an adaptive sensing method for scanning an environment, comprising a plurality of specific regions, surrounding an autonomous automobile. In some embodiments, the method comprises providing a millimeter wave automotive radar. In other embodiments, the millimeter wave automotive radar comprises: one or more millimeter wave transceivers, a 3D printed Luneburg lens having an upper frequency limit in a millimeter wave range, a plurality of antenna feed elements operatively coupled to the one or more millimeter wave transceivers, and one or more processing elements operatively coupled to the plurality of antenna feed elements and transceivers. In an alternative embodiment, the one or more millimeter wave transceivers are each separate transmitter and receiver devices. In an embodiment, the plurality of antenna feed elements are mounted to a surface of the 3D printed Luneburg lens and are each positioned in a determined direction. In another embodiment, the one or more processing elements processes a given signal originating from a specific region, of the plurality of specific regions.

Figure 1:
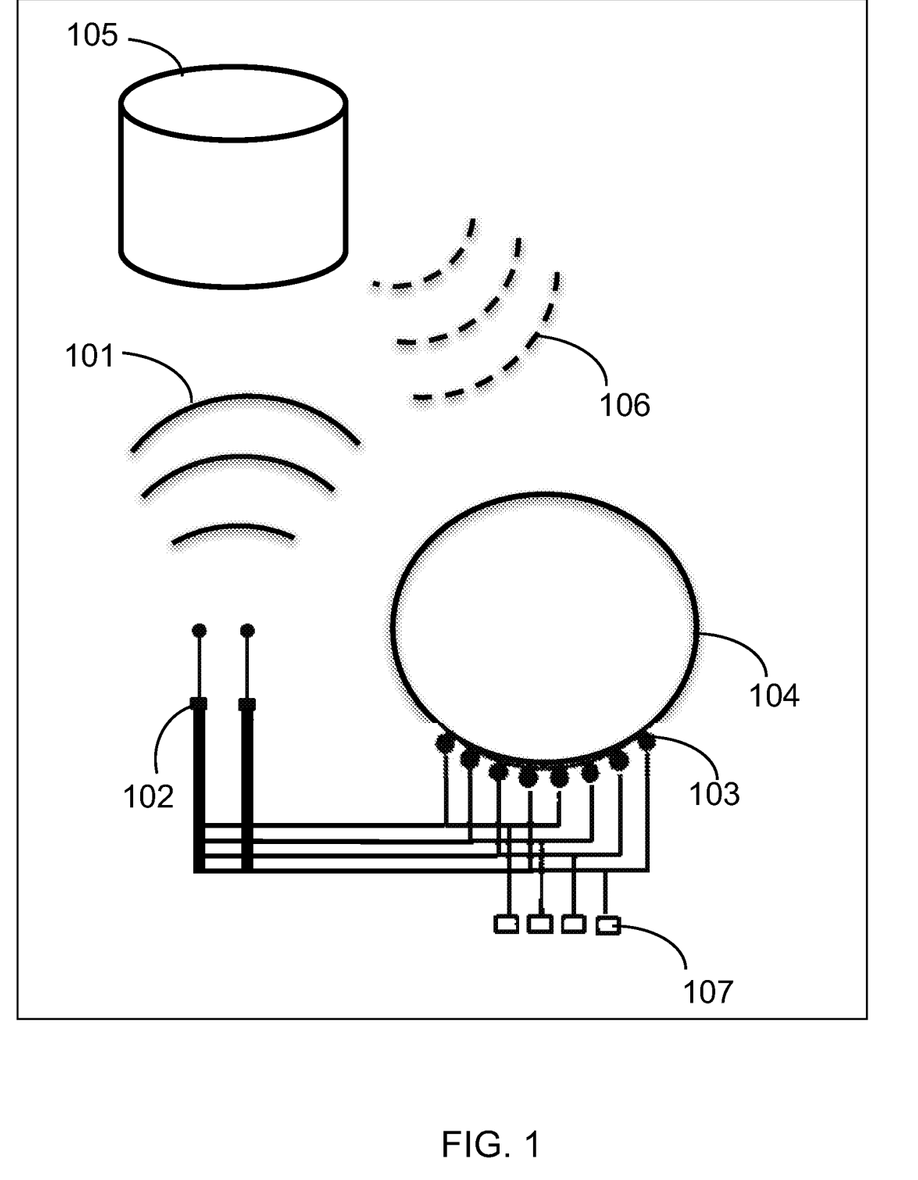
FIG. 1 shows an exemplary representation of the present millimeter wave automotive radar.
Figure 2:
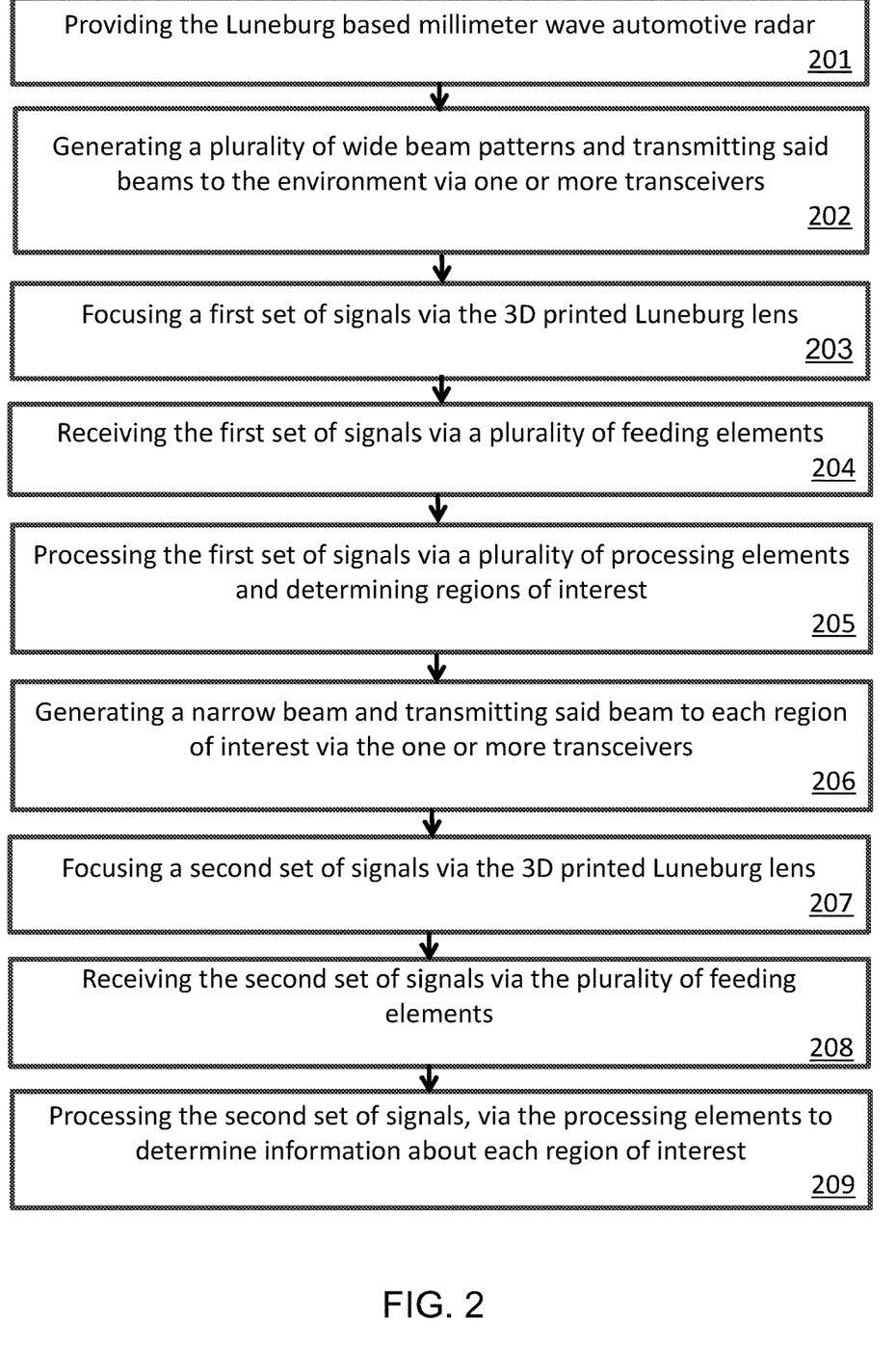
FIG. 2 shows a flow diagram that details the scanning procedure of the present millimeter wave automotive radar in accordance with an exemplary embodiment.
Figure 3:
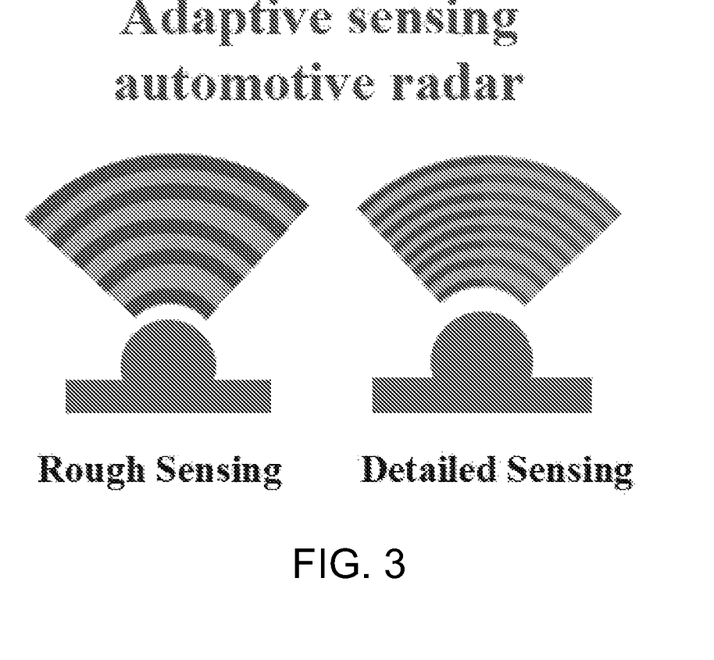
FIG. 3 is a depiction of the adaptive sensing method employed by the millimeter wave automotive radar of the present invention.

In further embodiments, a rough scan of the environment is performed via the millimeter wave automotive radar. In preferred embodiments, the rough scan comprises the steps of:
  (i) generating one or more wide beam patterns, via the plurality of processing elements, that are transmitted to the environment by the one or more millimeter wave transceivers (202);
  (ii) receiving a first set of signals, resulting from interactions between the plurality of wide beam patterns and the environment, via the plurality of antenna feed elements, where the first set of signals are focused by the 3D printed Luneburg lens prior to their reception by the plurality of antenna feed elements (203); and
  (iii) processing the first set of signals via the plurality of processing elements, where, if a signal strength of a signal exceeds a first predetermined threshold, then the specific region of the processing element is considered a region of interest (205).

In additional embodiments, a detailed scan is then performed of each region of interest comprising the steps of:
  (i) generating a narrow scanning beam, via the plurality of antenna feed elements, that is transmitted to each region of interest via the one or more millimeter wave transceivers (206);
  (ii) receiving a second set of signals via the one or more millimeter wave transceivers (208), where the second set of signals are a result of interactions between the narrow scanning beam and each region of interest, where the 3D printed Luneburg lens focuses the second set of signals prior to their reception by the plurality of antenna feed elements (207); and
  (iii) processing the second set of signals, via the plurality of processing elements, to determine information about each region of interest (209).

Use of the 3D printed Luneburg lens for digitally focusing the first and second set of signals before processing results in an improvement in signal to noise ratio, angular resolution, detection range, and processing speed of the millimeter wave automotive radar compared to conventional planar phased arrays. Further, performing the rough scan and, subsequently, the detailed scan adaptively adjusts a spatial sensing pattern, a sweeping frequency band, a pulse repetition frequency, and a coherent processing interval according to the environment as the rough scan updates sensing results via the narrow scanning beam of the detailed scan.

In supplementary embodiments, the signal strength of a signal processed by a given processing element exceeds the first predetermined threshold when the signal interacts with one or more objects of interest. In this way, sensing of objects in the environment is accomplished. Processing the second set of signals yields information about the one or more objects of interest sensed by the millimeter wave automotive radar.

In some embodiments, a plurality of first predetermined thresholds is set for a plurality of distances to detect a presence of the one or more objects of interest each residing a distance away from the millimeter wave automotive radar.

In an embodiment, one or more millimeter wave receivers and one or more millimeter wave transmitters are used in lieu of the one or more millimeter wave transceivers.

Figure 5A:
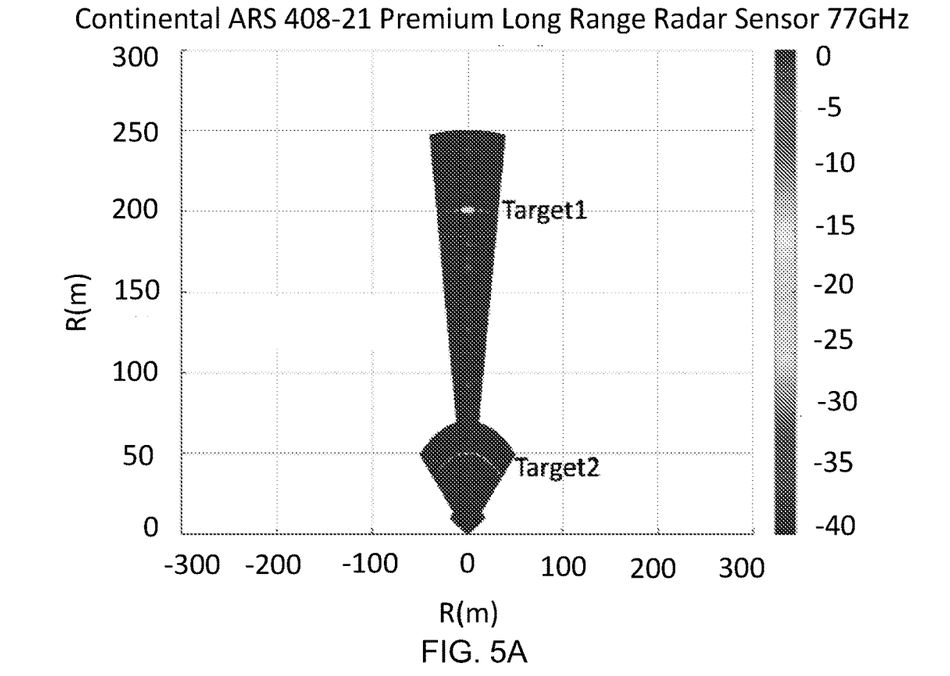
FIGS. 5A-5B show an example of radar output comparisons between conventional radar sensing and the present millimeter wave automotive radar in computing the angle between a detected object and the radar in use. Target 1 is located 0 degrees and 200 meters away from the radar; target 2 is located at 30 degrees and 50 meters away from the radar; and target 3 is located −45 degrees and 150 meters away from the radar.
Figure 5B:
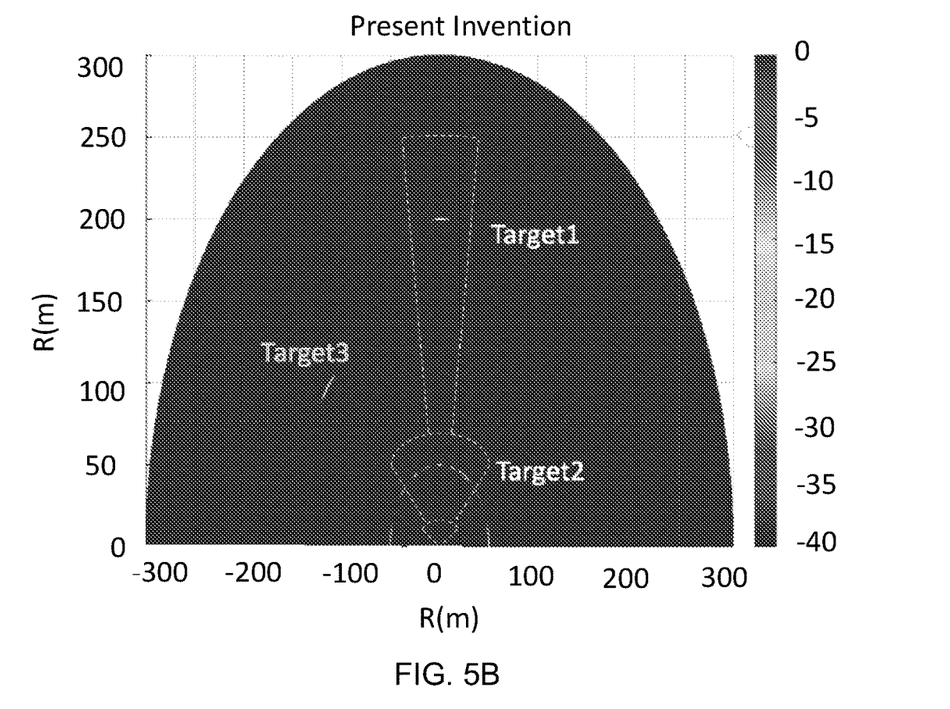
Figure 6:
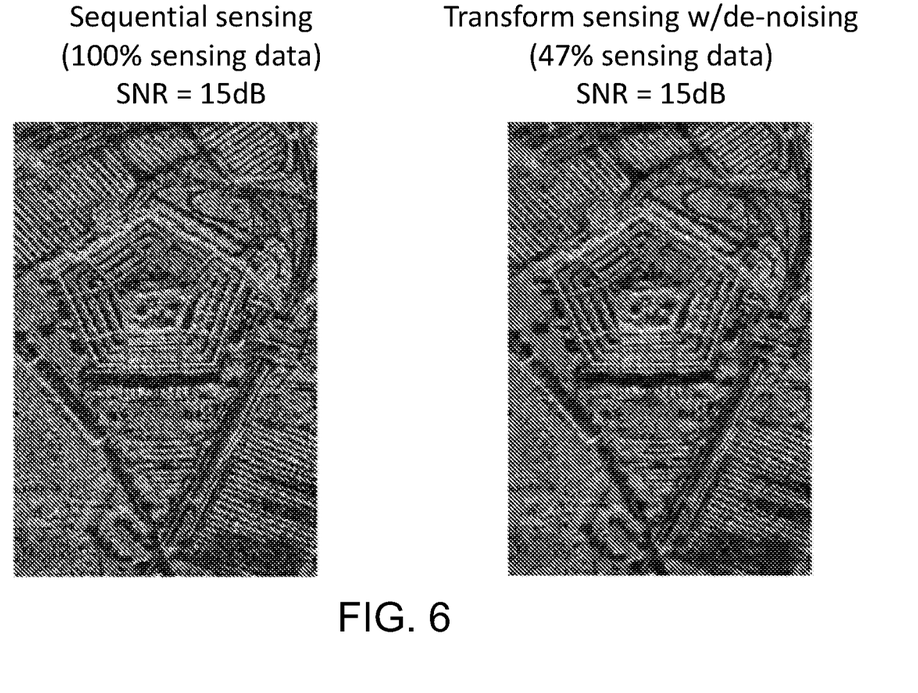
FIG. 6 shows the results of the present adaptive sensing method compared to results obtained using conventional methods. The present adaptive sensing method requires fewer samples to obtain sensing results compared to conventional autonomous automobile radars.
Figure 7:
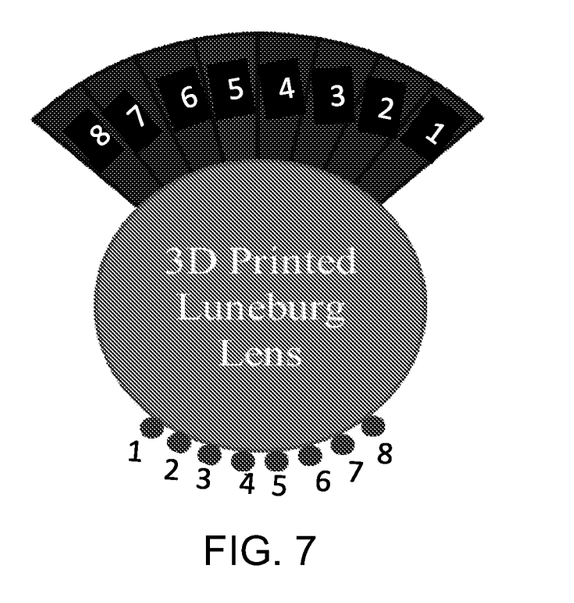
FIG. 7 shows a schematic illustration of the present millimeter wave automotive radar, where each transmitter/receiver covers a certain angle area of the environment.
Figure 8:
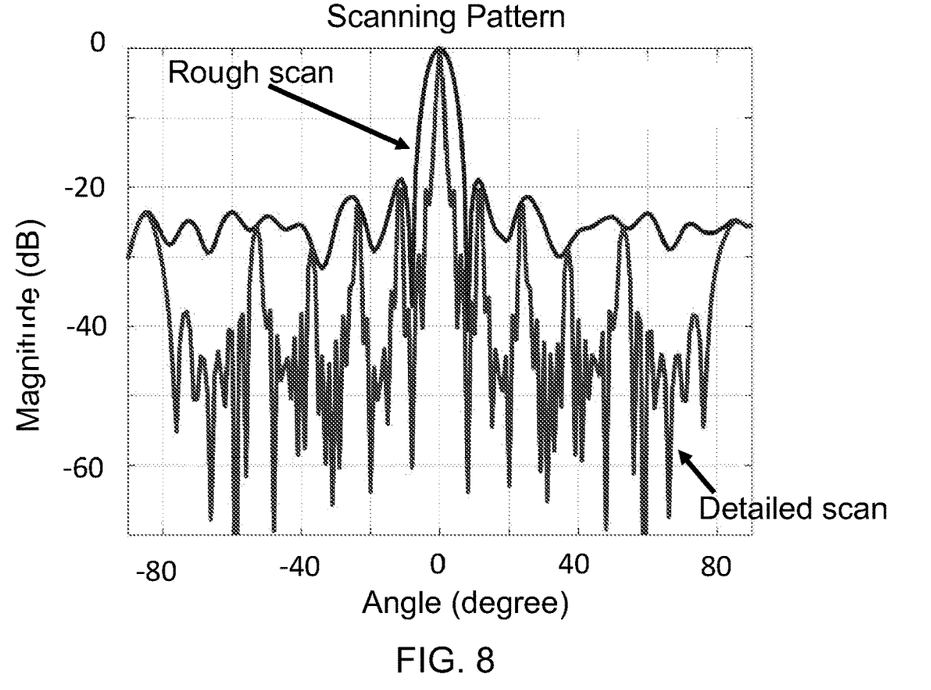
FIG. 8 shows an example of spatial sensing patterns for the adaptive sensing method.

In other embodiments, a MIMO technique is employed to improve the angular resolution of the millimeter wave automotive radar. In further embodiments, the MIMO technique comprises measuring a magnitude and a phase of the one or more millimeter wave receivers for each millimeter wave transmitter and calculating a plurality of phase differences for different target directions between each of the one or more millimeter wave transmitters. The plurality phase differences may then be compensated for and a plurality of radar results from different millimeter wave transmitters (of the one or more millimeter wave transmitters) are coherently added to generate a scanning beam narrower than a half power beam width of the 3D printed Luneburg lens to realize an improved angle resolution. The scanning beam may then be transmitted to each region of interest as the narrow scanning beam. As previously mentioned, the MIMO technique is effective for improving the angular resolution of the millimeter wave automotive radar for a given number of transceivers. In an alternate embodiment, the MIMO technique may be applied to decrease the number of transceivers required for a given angular resolution. An output comparison of the angle finding methods of a conventional planar array radar and the present millimeter wave automotive radar are displayed in FIG. 5.

In additional embodiments, the one or more wide beam patterns and the narrow scanning beam may be transmitted to the environment through one or more channels (or, alternately, frequency bands) of a millimeter wave spectrum. In preferred embodiments, the OSA is estimated to determine an availability of the one or more channels for a given period of time. In some embodiments, POMDP is used to estimate the OSA. The POMDP is used to describe the availability of channels. According to past observations of interference, the POMDP predicts the existence of interference in a given channel in the near future. Available channels are those having low probability of interference.

In an embodiment, subsequent narrow scanning beams are transmitted the regions of interest for a determined number of iterations. Each iteration may further narrow a number of the regions of interest and/or yield information about each region of interest in increasing detail.

Figure 11A:
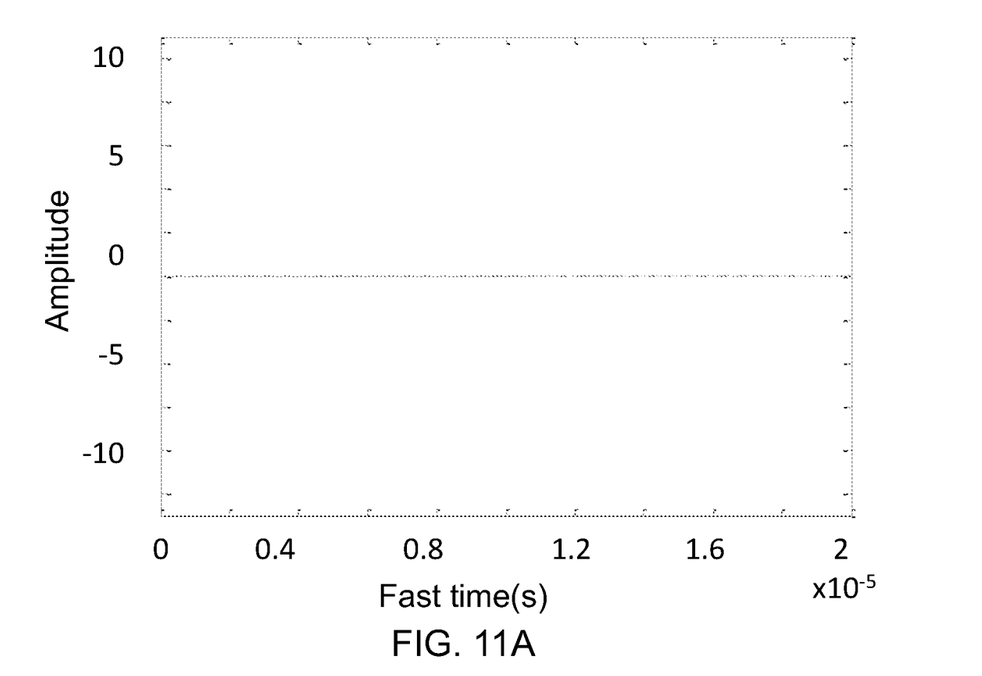
FIG. 11A shows a detected received signal before interference.
Figure 11B:
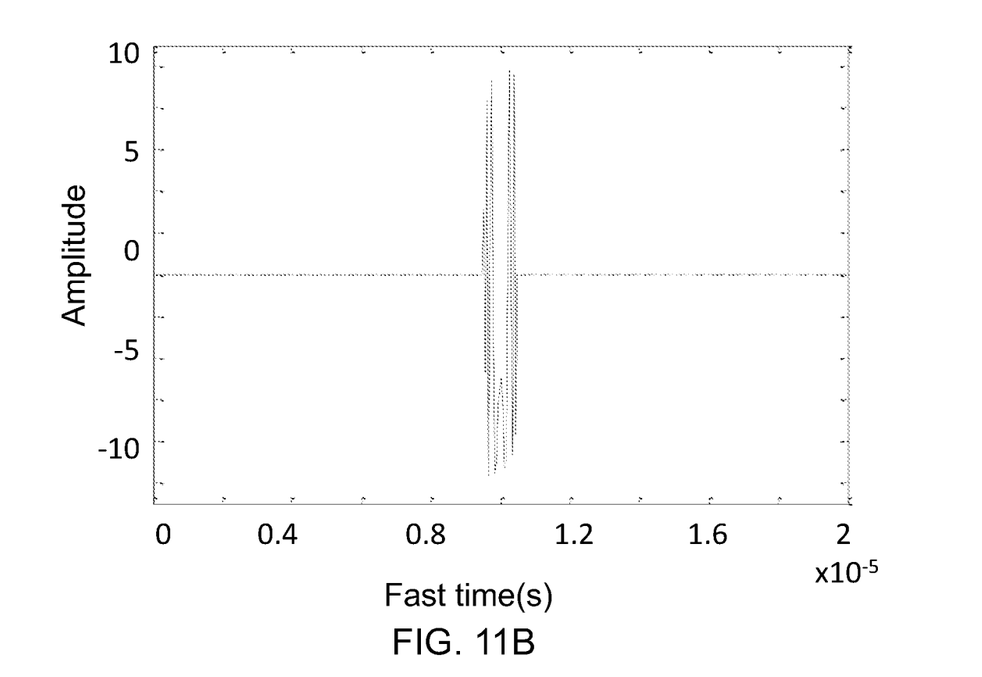
FIG. 11B shows a detected received signal in the presence of interference.
Figure 11C:
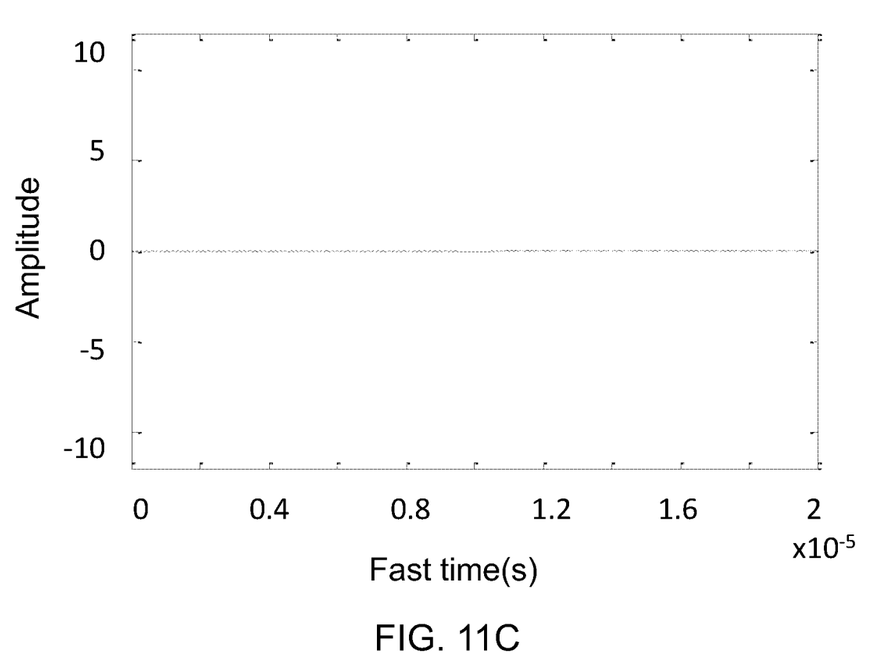
FIG. 11C shows a detected received signal after the interference signal has been excised.
Figure 12A:
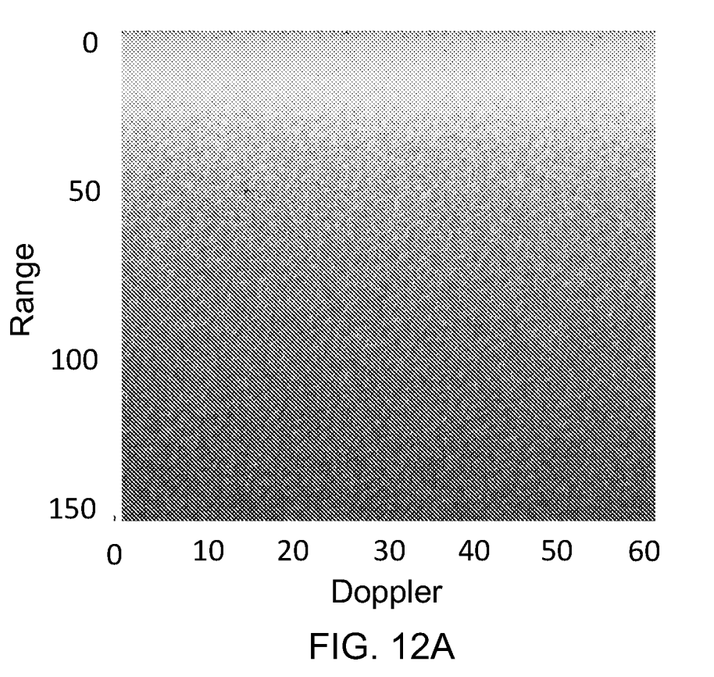
FIG. 12A shows the Range/Doppler results of the detected received signal of FIG. 11A.
Figure 12B:
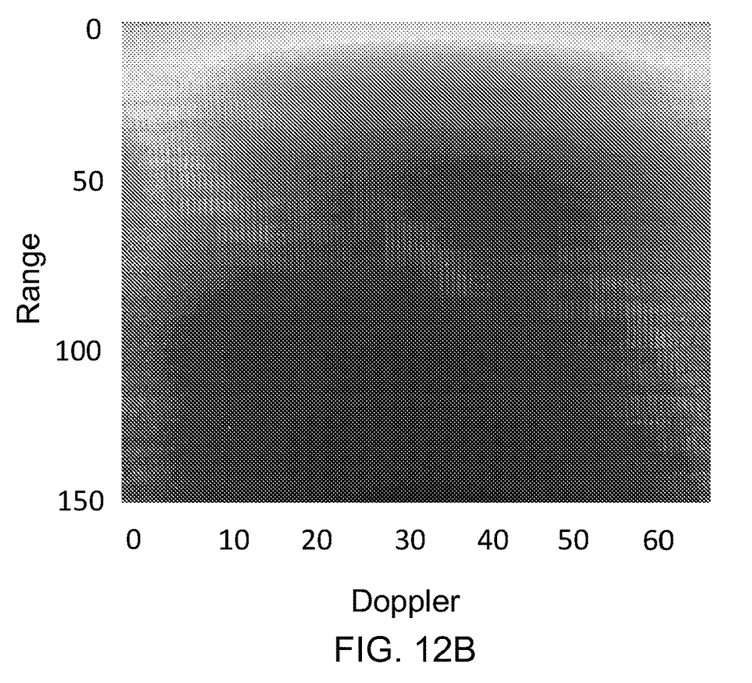
FIG. 12B shows the Range/Doppler results of the detected received signals of FIG. 11B.
Figure 12C:
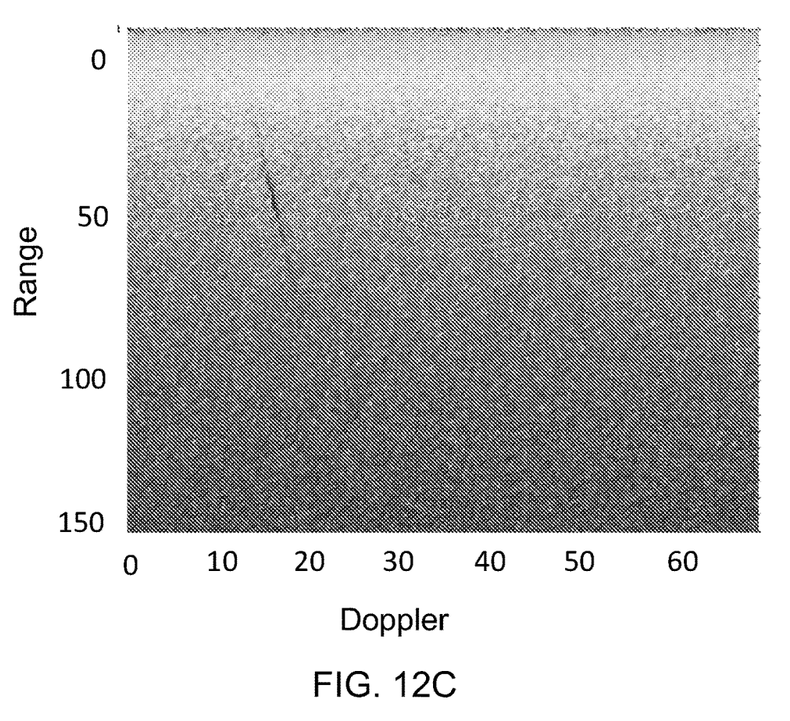
FIG. 12C shows the Range/Doppler results the detected received signal of FIG. 11C.

In supplementary embodiments, an interference suppression technique is employed to remove interference from any received signal. In some embodiments, the received signal may be the first set of signals, the second set of signals, or signals resulting from the transmission of subsequent narrow scanning beams to regions of interest. The present millimeter wave automotive radar typically employs linear frequency modulated waveforms as transmitted signals (see FIG. 10). Interference occurs when the signal of an intruder radar crosses these transmitted signals. Interference may cause the present adaptive sensing method to detect fake targets, increase the noise floor, or miss real targets when processing received signals. One way to suppress this interference is to excise received signals in the time domain. Note that the interference only exists when the signal of the intruder crosses the transmitted signals of the present radar. The interference typically has a short duration, as shown in FIG. 11B, and a significantly higher amplitude than received signals because the power of received signals decrease by a power of 4, while the power of the interference decreases by a power of 2 (both with respect to distance). In exemplary embodiments, the interference suppression technique is performed in the time domain and comprises the steps of:

(i) measuring an amplitude of the received signal,
(ii) determining if the amplitude exceeds a second predetermined threshold, and
(iii) excising a portion of the amplitude of the received signal exceeding the second predetermined threshold.

In further embodiments, each processing element comprises a memory operatively coupled to a processor executing one or more sets of instructions stored in the memory. In an embodiment, the one or more sets of instructions comprises generating the one or more wide beam patterns and the narrow scanning beam, processing the first set of signals and the second set of signals, and executing the MIMO and interference techniques. In another embodiment, the memory further stores the plurality of first predetermined thresholds and the second predetermined threshold.

In some embodiments, the angle of a detected object relative to the millimeter wave automotive radar is detected using the amplitude values of the first set of signals and the calibrated sensitivity factors of the plurality of processing elements. As a result of the special focusing property of the Luneburg lens, the angle finding computational cost is greatly reduced compared to conventional radar systems using a planar array (which uses a Fast Fourier Transform ("FFT") in the angle finding computation). For conventional radar systems, the angle finding approach is based on the measured phase difference between different receivers (alternately, elements). With an N element planar array radar system, the computational cost in the angle finding technique employing FFT is proportional to $N*\log_2(N)$. Regarding the present Luneburg lens based millimeter wave automotive radar, since the electromagnetic wave (e.g., received signal) from different directions are focused by the lens, the angle finding procedure is much simpler. Accurate angle finding results can be directly obtained from the measured amplitude value and calibrated sensitivity factor of each receiver. For an N-element Luneburg lens millimeter wave radar, the computational cost is proportional to N, which is much faster than the conventional radar system. For example, for a 16-element Luneburg lens based radar, the processing time will be at least 4 times faster than the conventional radar having the same number of elements. By estimation, a less than 1-millisecond computational time is required for angle finding with the present radar. Since the angle finding technique of the present millimeter wave automotive radar is amplitude based, the calibration compensating for the differences between receiver elements may be performed to improve the angle finding results.

POMDP Details

Figure 4:
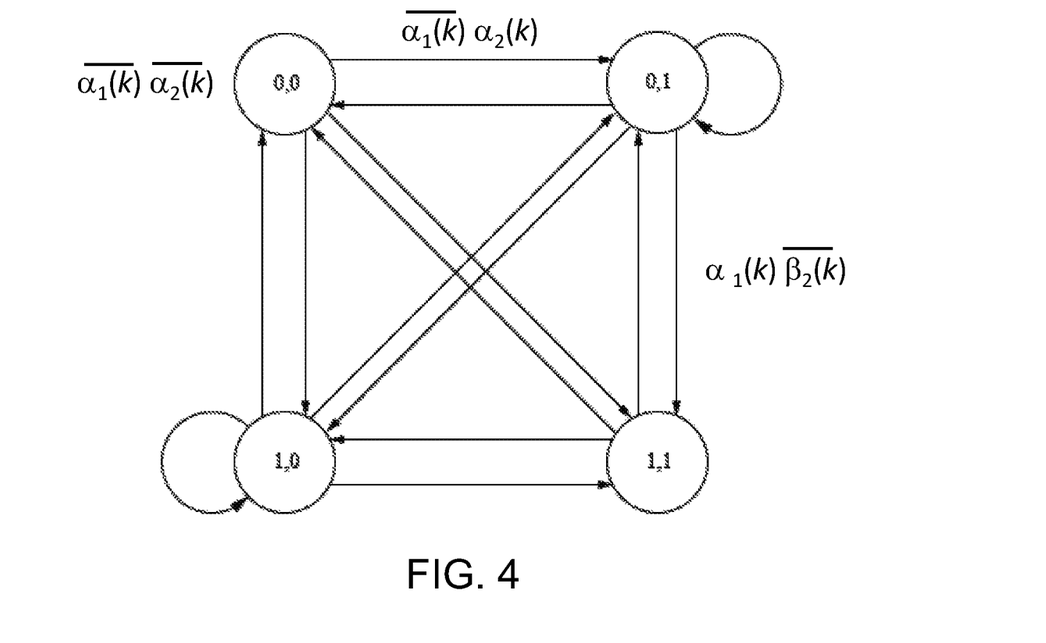
FIG. 4 is a depiction of the dynamic spectrum access method used to predict interference.

N frequency bands can be modeled by a discrete-time Markov chain with $M=2^N$ states, where the state is defined as the availability of each band. The transition probability, $p(k)_{i,j}$, can be readily obtained from $\{\alpha(k)_i, \beta(k)_j\}_{i=1}^{N}$, where k represents a type of waveform of the interference radar, $\alpha$ represents a channel's probability from busy to idle, $\beta$ represents a channel's probability from idle to busy, and i and j represent different channels. The state diagram for N=2 is illustrated in FIG. 4, where $\overline{\alpha(k)_i} = 1 - \alpha(k)_i$, and state $\{1,0\}$ indicates that the first band is available while the second band is busy. Since in each time slot, the user can only select one band to transmit a signal and determine interference, the state of the millimeter wave spectrum is only partially observable. Let $n(n=1, \ldots, T)$ denote the number of remaining decision intervals. For a finite horizon POMDP over T time slots, a time slot, T-n+1, and action, a, are selected that will optimize performance in the remaining n decision intervals. The dynamic behavior of the information vector $\pi$ is a discrete-time continuous-state Markov process. Given the prior information $\pi$ on the state of the millimeter wave spectrum, the current knowledge $\pi'$, after observing $\theta$ under action a, can be easily obtained via Bayes' rule:

$$\pi' = [\pi'_1, \ldots, \pi'_M]_{\pi' = [\pi'_1, \ldots, \pi'_M]}$$

$$\pi'_j = \frac{\prod_{i=1}^{M} \prod_{i=1}^{K} \pi_i p(k)_{i,j} Pr[\Theta_j, a, k = \theta(k)]}{\prod_{i=1}^{M} \prod_{j=1}^{M} \prod_{k=1}^{K} \pi_i p(k)_{i,j} Pr[\Theta_j, a, k = \theta(k)]},$$

where the former equation is the updated information vector from $\pi$ based on observation $\theta$ and action $\alpha$.

Experimental Details

In a detailed embodiment of the present millimeter wave automotive radar, transmitter (RPN7720, 10 dBm output power) and receiver (RRN7745, 14 dB noise figure) chips from Infineon were used. Assuming the gain of the Luneburg lens is 23 dB, the received signal at the receiver will be: $P_r = P_t \cdot G^2 \cdot \sigma \cdot \lambda^2 / (4\pi)^3 \cdot R^4 = -67$ dBm when the object of interest has a radar cross section ("RCS") of 10 m² and is 20 meters away from the radar (typical RCS for an automobile is about 100 m²) with a 30 MHz radar system bandwidth. Considering thermal noise and a typical 14 dB receiver noise figure, the signal to noise ratio will be 18 dB in the receiver channel. The worst case scenario, of an object with 1 m² RCS (typical RCS for pedestrian) at 100 meters from the radar, requires a 26 dB gain.

Figure 9A:
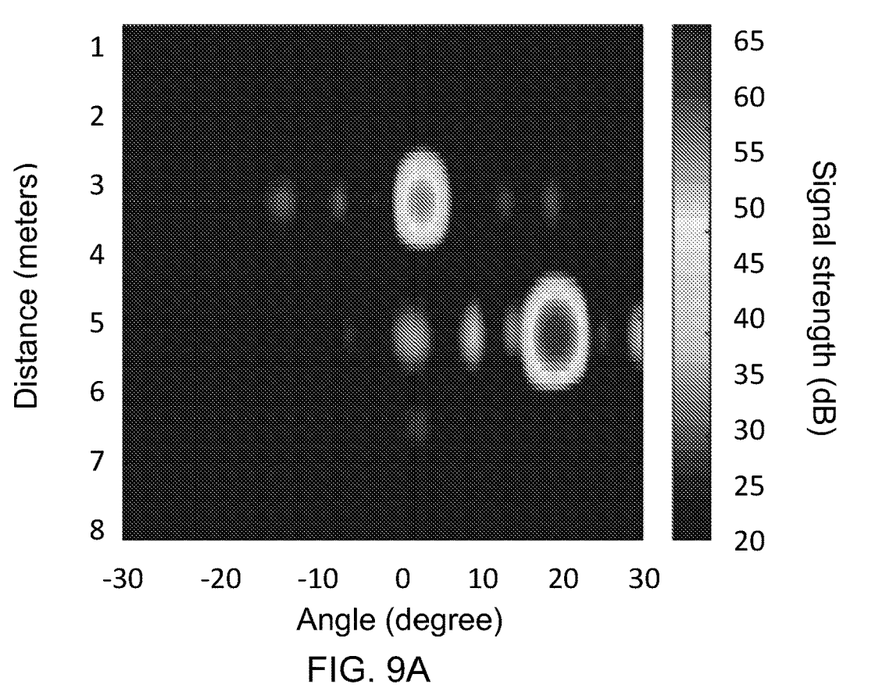
FIG. 9A shows a target imaged generated by the present millimeter wave automotive radar without applying the present adaptive sensing method.
Figure 9B:
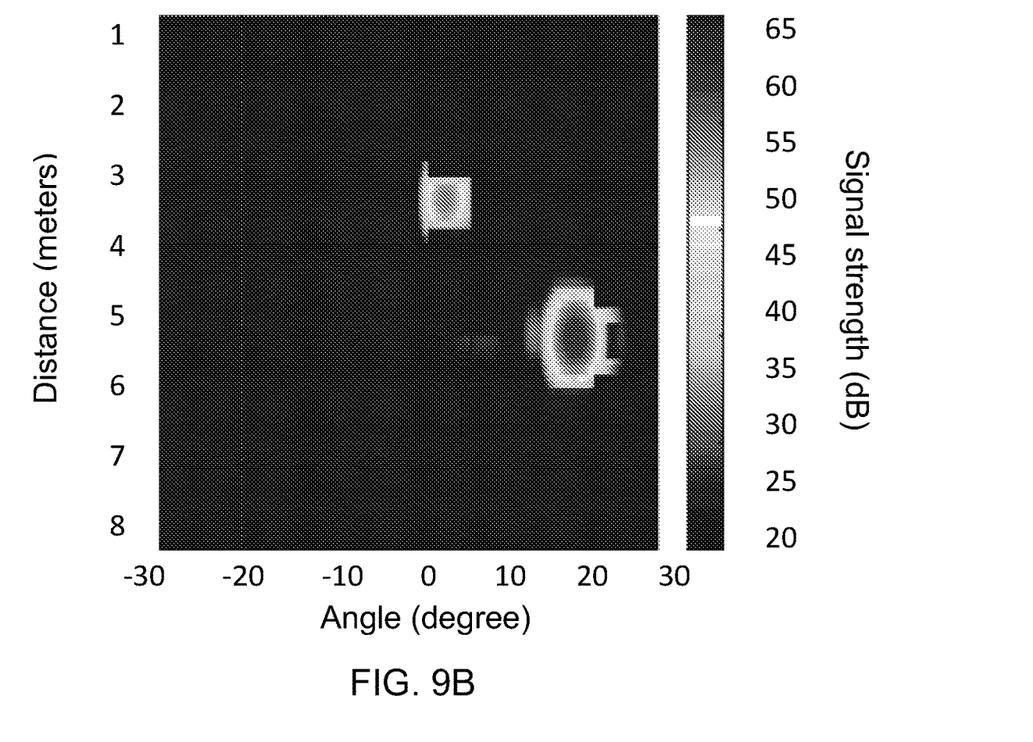
FIG. 9B shows a target imaged generated by the present millimeter wave automotive radar applying the present adaptive sensing method.
Figure 10:
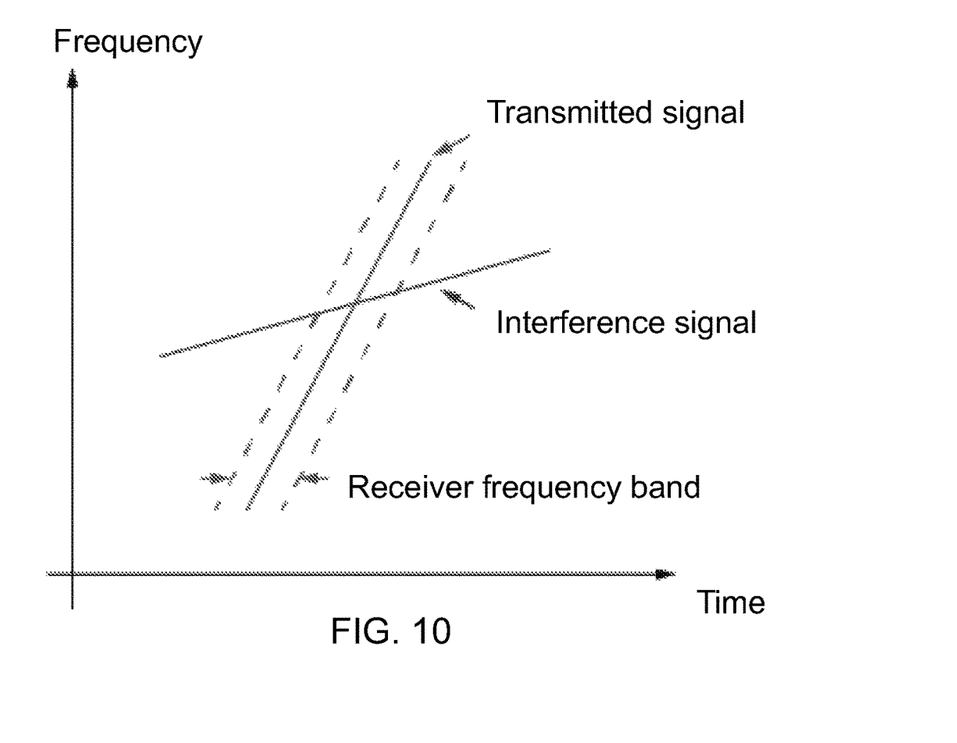
FIG. 10 shows a depiction of interference generated when two signals are crossing.

FIGS. 9A-9B shows a target image generated by the present millimeter wave automotive radar with and without applying the present adaptive sensing method. In this example, the processing time is shorted by a factor of 10 using present the adaptive sensing method.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

REFERENCES

Liang, M., Ng, W. R., Chang, K., Gbele, K., Gehm, M. E., & Xin, H. (2014). A 3-D luneburg lens antenna fabricated by polymer jetting rapid prototyping. IEEE Transactions on Antennas and Propagation, 62(4), 1799-1807. [6698375]. DOI:

What is claimed is:

1. An adaptive sensing method for scanning an environment surrounding an autonomous automobile, wherein the environment comprises a plurality of specific regions, the method comprising:
    (a) providing a millimeter wave automotive radar comprising:
        (i) one or more millimeter wave transceivers;
        (ii) a 3D printed Luneburg lens having an upper frequency limit in a millimeter wave range; and
        (iii) a plurality of antenna feed elements, operatively coupled to the one or more millimeter wave transceivers, mounted to a surface of the 3D printed Luneburg lens, each positioned in a determined direction; and
        (iv) one or more processing elements operatively coupled to the plurality of antenna feed elements and to the one or more millimeter wave transceivers;
    (b) performing a rough scan of the environment, the steps comprising:
        (i) generating one or more wide beam patterns, via the plurality of processing elements, that are transmitted to the environment via the one or more millimeter wave transceivers;
        (ii) receiving a first set of signals, resulting from interactions between the one or more wide beam patterns and the environment, via the one or more millimeter wave transceivers, wherein each signal has a signal strength, wherein the 3D printed Luneburg lens focuses the first set of signals prior to their reception by the plurality of antenna feed elements; and
        (iii) processing the first set of signals via the plurality of processing elements, wherein if the signal strength of a signal processed by a processing element exceeds a first predetermined threshold, then the specific region of the processing element is a region of interest;
    (c) performing a detailed scan of each region of interest, the steps comprising:
        (i) generating a narrow scanning beam, via the plurality of antenna feed elements, that is transmitted to each region of interest via the one or more millimeter wave transceivers;
        (ii) receiving a second set of signals via the one or more millimeter wave transceivers, wherein the second set of signals are a result of interactions between the narrow scanning beam and each region of interest, wherein the 3D printed Luneburg lens focuses the second set of signals prior to their reception by the plurality of antenna feed elements; and
        (iii) processing the second set of signals, via the plurality of processing elements, to determine information about each region of interest
        wherein performance of the rough scan and, subsequently, the detailed scan adaptively adjusts a spatial sensing pattern, a sweeping frequency band, a pulse repetition frequency, and a coherent processing interval according to the environment as the rough scan updates sensing results via the narrow scanning beam of the detailed scan.

2. The method of claim 1, wherein the signal strength of the signal processed by a given processing element exceeds the first predetermined threshold when the signal interacts with one or more objects of interest, wherein processing of the second set of signals yields information about the one or more objects of interest.

3. The method of claim 2, wherein a plurality of first predetermined thresholds is set for a plurality of distances to detect a presence of the one or more objects of interest each residing a distance, of the plurality of distances, away from the millimeter wave automotive radar.

4. The method of claim 3, wherein the one or more millimeter wave transceivers comprises one or more millimeter wave receivers and one or more millimeter wave transmitters.

5. The method of claim 4, wherein a multiple input multiple output ("MIMO") technique is employed to improve the angular resolution of the millimeter wave automotive radar, wherein the MIMO technique comprises:

(a) measuring a magnitude and a phase of the one or more millimeter wave receivers for each millimeter wave transmitter;
(b) calculating a plurality of phase differences for different target directions between each of the millimeter wave transmitters;
(c) compensating for the plurality phase differences; and
(d) coherently adding a plurality of radar results from different millimeter wave transmitters to generate a scanning beam narrower than a half power beam width of the 3D printed Luneburg lens, wherein the scanning beam is transmitted to each region of interest as the narrow scanning beam.

6. The method of claim 5, wherein an interference suppression technique is applied to remove interference from a received signal, including the first and second set of signals, wherein the interference suppression technique is performed in a time domain of the received signal and comprises the steps of:
(a) measuring an amplitude of the received signal,
(b) determining if the amplitude exceeds a second predetermined threshold, and
(c) excising a portion of the amplitude of the received signal exceeding the second predetermined threshold.

7. The method of claim 6, wherein each processing element comprises a memory operatively coupled to a processor executing one or more sets of instructions stored in the memory, wherein the one or more sets of instructions comprises generating the one or more wide beam patterns and the narrow scanning beam, processing the first set of signals and the second set of signals, and executing the MIMO and interference techniques, wherein the memory further stores the plurality of first predetermined thresholds and the second predetermined threshold.

8. The method of claim 1, wherein the one or more wide beam patterns and the narrow scanning beam are transmitted to the environment through one or more channels of a millimeter wave spectrum, wherein an opportunity spectrum access ("OSA") is estimated to determine an availability of the one or more channels for a given period of time.

9. The method of claim 8, wherein Partially Observable Markov Decision Process is used to estimate the OSA for the millimeter wave automotive radar.

10. The method of claim 1, wherein step (c) is iterated a determined number of times, wherein each iteration further narrows a number of the regions of interest and/or yields information about each region of interest in increasing detail.

11. A millimeter wave automotive radar effective for scanning an environment surrounding an autonomous automobile, wherein the environment comprises a plurality of specific regions, the radar comprising:
(a) one or more millimeter wave transceivers;
(b) a 3D printed Luneburg lens having an upper frequency limit in a millimeter wave range;
(c) a plurality of antenna feed elements, operatively coupled to the one or more millimeter wave transceivers, mounted to a surface of the 3D printed Luneburg lens, each positioned in a determined direction; and
(d) one or more processing elements operatively coupled to the plurality of antenna feed elements and to the one or more millimeter wave transceivers;
wherein a rough scan of the environment is performed, via one or more wide beam patterns generated by the one or more processing elements, wherein the one or more wide beam patterns are transmitted to the environment via the one or more millimeter wave transceivers, wherein a first set of signals are received by the one or more millimeter wave transceivers, wherein the first set of signals are processed by the one or more processing elements to determine one or more regions of interest,
wherein a detailed scan is then performed by generating and transmitting a narrow scanning beam to scan the one or more regions of interest, which results in a second set of signals received by the one or more millimeter wave transceivers, wherein the second set of signals are processed, via the one or more processing elements, to determine information about each region of interest,
wherein the 3D printed Luneburg lens focuses the first and second set of signals prior to their reception by the plurality of antenna feed elements,
wherein performance of the rough scan and, subsequently, the detailed scan can adaptively adjust a spatial sensing pattern, a sweeping frequency band, a pulse repetition frequency, and a coherent processing interval according to the environment as the rough scan updates sensing results via the narrow scanning beam of the detailed scan.

12. The system of claim 11, wherein each signal, of the first set of signals, has a signal strength, wherein if the signal strength of a signal processed by a processing element exceeds a first predetermined threshold, then the specific region of the processing element is a region of interest, of the one or more regions of interest.

13. The system of claim 12, wherein the signal strength exceeds the first predetermined threshold when one or more objects of interest are in the specific region.

14. The system of claim 13, wherein processing of the second set of signals yields information about the one or more objects of interest.

15. The system of claim 13, wherein a plurality of first predetermined thresholds is set for a plurality of distances to detect a presence of the one or more objects of interest each residing a distance, of the plurality of distances, away from the millimeter wave automotive radar.

16. The system of claim 15, wherein the one or more millimeter wave transceivers comprises one or more millimeter wave receivers and one or more millimeter wave transmitters.

17. The system of claim 16, wherein a multiple input multiple output ("MIMO") technique is employed to improve the angular resolution of the millimeter wave automotive radar, wherein the MIMO technique comprises:
(a) measuring a magnitude and a phase of the one or more millimeter wave receivers for each millimeter wave transmitter;
(b) calculating a plurality of phase differences for different target directions between each of the one or more millimeter wave transmitters;
(c) compensating the plurality phase differences; and
(d) coherently adding a plurality of radar results from different transmitters to generate a scanning beam narrower than a half power beam width of the 3D printed Luneburg lens,
wherein the scanning beam is transmitted to each region of interest as the narrow scanning beam.

18. The system of claim 17, wherein an interference suppression technique is applied to remove interference from a received signal, including the first and second set of signals, wherein the interference suppression technique is performed in a time domain of the received signal and comprises the steps of:

(a) measuring an amplitude of the received signal,
(b) determining if the amplitude exceeds a second predetermined threshold, and
(c) excising a portion of the amplitude of the received signal exceeding the second predetermined threshold.

19. The system of claim 18, wherein each processing element comprises a memory operatively coupled to a processor executing one or more sets of instructions stored in the memory, wherein the one or more sets of instructions comprises generating the one or more wide beam patterns and the narrow scanning beam, processing the first set of signals and the second set of signals, and executing the MIMO and interference techniques, wherein the memory further stores the plurality of first predetermined thresholds and the second predetermined threshold.

20. The system of claim 11, wherein the detailed scan of the one or more regions of interest is performed for a number of iterations, wherein each iteration further narrows a number of the regions of interest and/or yields information about each region of interest in increasing detail.

\* \* \* \* \*